United States Patent
Cho et al.

(10) Patent No.: US 9,645,541 B2
(45) Date of Patent: May 9, 2017

(54) ELECTRIC POWER SUPPLY DEVICE WHICH CAN REDUCE THE AMOUNT OF POWER CONSUMPTION

(71) Applicant: KONICA MINOLTA, INC., Chiyoda-ku (JP)

(72) Inventors: Kouei Cho, Toyokawa (JP); Toru Kasamatsu, Toyokawa (JP); Mikiyuki Aoki, Toyohashi (JP); Yohei Yamada, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/619,267

(22) Filed: Feb. 11, 2015

(65) Prior Publication Data
US 2015/0229231 A1    Aug. 13, 2015

(30) Foreign Application Priority Data
Feb. 13, 2014    (JP) .................................. 2014-025830

(51) Int. Cl.
G03G 15/00    (2006.01)
H02M 3/335    (2006.01)
H02M 1/00    (2006.01)

(52) U.S. Cl.
CPC ......... G03G 15/80 (2013.01); G03G 15/5004 (2013.01); H02M 3/33507 (2013.01); H02M 2001/009 (2013.01)

(58) Field of Classification Search
CPC .................................................... G03G 15/80
See application file for complete search history.

(56) References Cited

FOREIGN PATENT DOCUMENTS

| JP | 11-327663 | 11/1999 |
|----|-----------|---------|
| JP | 2003-169470 A | 6/2003 |
| JP | 2006-174658 | 6/2006 |
| JP | 2013-078187 | 4/2013 |

OTHER PUBLICATIONS

Machine translation of JP2013-078187.*
Notice of Grounds of Rejection issued in corresponding Japanese Patent Application No. 2014-025830, dated Dec. 15, 2015, with English Translation (14 pages).

* cited by examiner

*Primary Examiner* — David Gray
*Assistant Examiner* — Andrew V Do
(74) *Attorney, Agent, or Firm* — Buchanan Ingersoll & Rooney PC (57) ABSTRACT

Image forming apparatus comprises an electric power supply circuit board, an electric power control unit, functional circuits, and an electrical power saving circuit. The electric power control unit executes constant voltage control, to make electrical potential of a remote sensing location constant. The functional circuits are connected with the electric power supply circuit board. The electrical power saving circuit switches the state of functional circuits between the state in which they are provided with electric power and the state in which they are not provided with electric power. The electrical power saving circuit sets the contact point of the input side of the circuit, in which the consumption electrical current or the behavior guarantee minimum electrical voltage is the largest, out of the electrical power saving circuit and functional circuits provided with electric power, as the remote sensing location.

11 Claims, 9 Drawing Sheets

| PRIORITY | CIRCUIT |
|---|---|
| 1 | F CIRCUIT1 (DEVICE CONNECTED) |
| 2 | F CIRCUIT 3 |
| 3 | F CIRCUIT 4 |
| 4 | F CIRCUIT 2 |
| 5 | F CIRCUIT 1 (DEVICE NOT CONNECTED) |
| 6 | POWER SAVING CIRCUIT |

CONSUMPTION E CURRENT OR
BEHAVIOR GUARANTEE
MINIMUM E VOLTAGE

↑ HIGH

↓ LOW

ELECTRIC POWER SUPPLY DEVICE WHICH CAN REDUCE THE AMOUNT OF POWER CONSUMPTION

This application is based on Japanese Patent Application No. 2014-25830 filed with the Japan Patent Office on Feb. 13, 2014, the entire content of which is hereby incorporated by reference.

BACKGROUND OF THE INVENTION

Field of the Invention

This invention relates to an electric power supply device and an image forming apparatus having the electric power supply device. More specifically, this invention relates to an electric power supply device which can reduce the amount of power consumption and an image forming apparatus having such an electric power supply device.

Description of the Related Art

An image forming apparatus with electrophotographic technology may be a MFP (Multi Function Peripheral) having a scanner function, a facsimile function, a copying function, a function as a printer, a data transmitting function and a server function, a facsimile device, a copying machine, a printer or the like.

Figure 8:
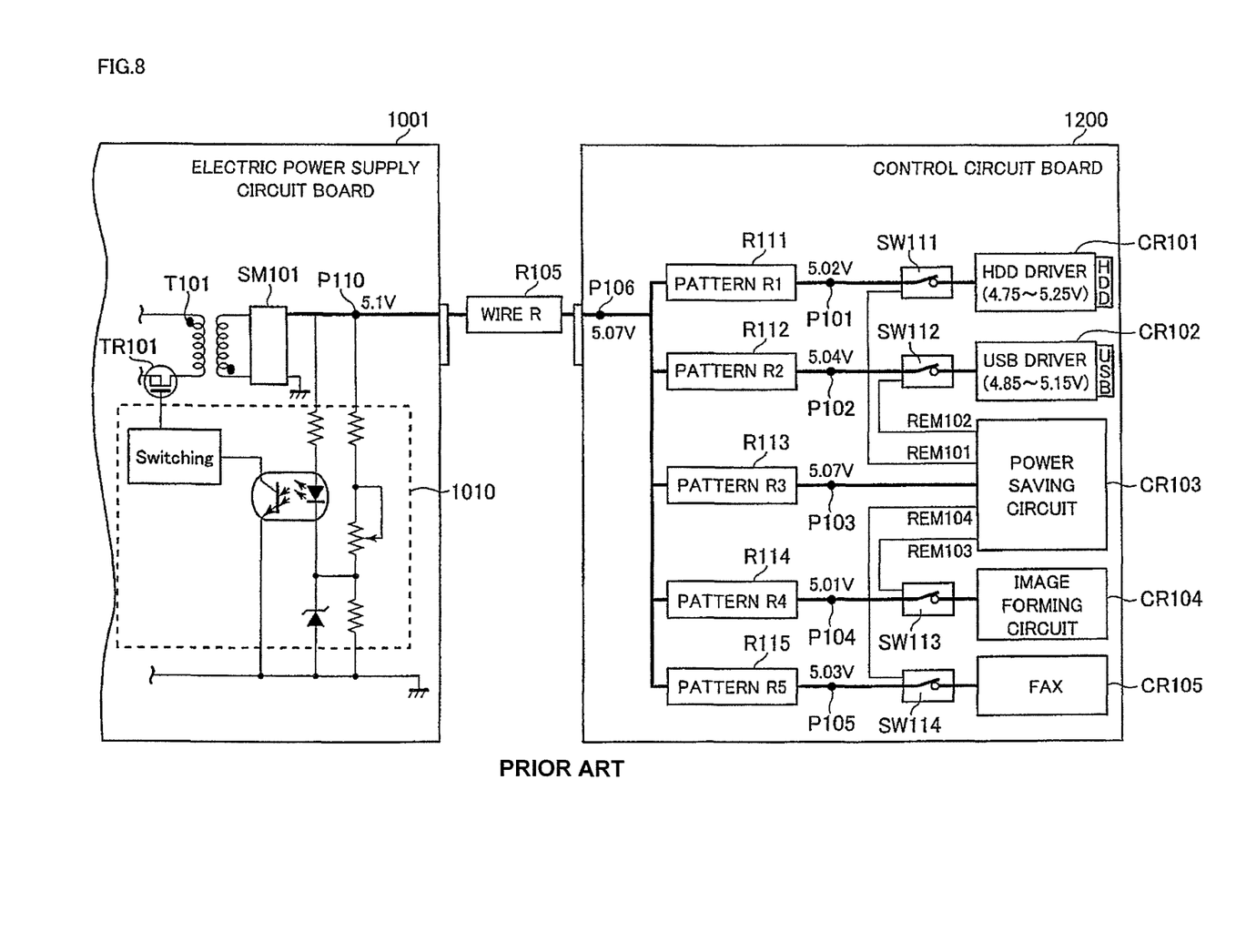
FIG. 8 schematically shows a block diagram of a circuit structure of an electric power supply circuit board and control circuit board, when a conventional image forming apparatus is in a normal condition.

FIG. 8 schematically shows a block diagram of a circuit structure of an electric power supply circuit board and control circuit board, when a conventional image forming apparatus is in the normal condition.

Referring to FIG. 8, the conventional image forming apparatus is equipped with an electric power supply circuit board 1001, an electric wire resistor (a wire harness) R105, and a control circuit board 1200 which controls behavior of each element of the image forming apparatus. Electric power supply circuit board 1001 and control circuit board 1200 are electrically connected via electric wire resistor R105. Electric power supply circuit board 1001 provides direct current power to control circuit board 1200 via electric wire resistor R105.

Electric power supply circuit board 1001 includes a transformer T101, a secondary side rectification and smoothing circuit (a condenser) SM101, a constant voltage control unit 1010, and a transistor TR101. Transformer T101 is a DC-DC converter. Transistor TR101 is a P channel type MOSFET (Metal-Oxide-Semiconductor Field-Effect Transistor).

A primary side coil of transformer T101 is connected with the source and the drain of transistor TR101. A secondary side coil of transformer T101 is connected with secondary side rectification smoothing circuit SM101. The one output terminal of secondary side rectification smoothing circuit SM101 is connected with the one end of electric wire resistor R105. The other output terminal of secondary side rectification smoothing circuit SM101 is connected with ground potential. A contact point P110 is located on a conducting wire connecting the one output terminal of secondary side rectification smoothing circuit SM101 and electric wire resistor R105. Constant voltage control unit 1010 adopts contact point P110 as the remote sensing location, and controls outputting electrical voltage of electric power supply circuit board 1001 at constant voltage, to keep electrical potential of contact point P110 constant.

Control circuit board 1200 includes resistor elements R111, R112, R113, R114, and R115, switches SW111, SW112, SW113, and SW114, and functional circuits CR101, CR102, CR103, CR104, and CR105. Each of resistor elements R111, R112, R113, R114, and R115 is a pattern resistor. Functional circuit CR101 is a HDD (Hard Disk Drive) driver, and for example, performs guaranteed behavior at electrical voltage of 4.75V (voltage) to 5.25V. Functional circuit CR102 is a USB (Universal Serial Bus) driver, and for example, performs guaranteed behavior at electrical voltage of 4.85V to 5.15V. Functional circuit CR103 is an electrical power saving circuit, and is enabled at all times. Functional circuit CR104 is an image forming circuit which controls image forming. Functional circuit CR105 is a facsimile circuit which controls transmitting and receiving of facsimile.

The one end of each of resistor elements R111, R112, R113, R114, and R115 is connected with electric wire resistor R105. Resistor element R111, switch SW111, and functional circuit CR101 are connected in series in this order. Resistor element R112, switch SW112, and functional circuit CR102 are connected in series in this order. Resistor element R113 and functional circuit CR103 are connected in series in this order. Resistor element R114, switch SW113, and functional circuit CR104 are connected in series in this order. Resistor element R115, switch SW114, and functional circuit CR105 are connected in series in this order. Functional circuit CR103 controls on-off of each of switches SW111, SW112, SW113, and SW114, by transmitting each of electric power supply signals REM101, REM102, REM103, and REM104, based on the behavior of the image forming apparatus.

Specifications of inputting electrical voltage are set for control circuit board 1200. In case that electrical voltage of the contact point of the input of each of functional circuits CR101, CR102, CR103, CR104, and CR105 is less than the inputting electrical voltage of the specifications of control circuit board 1200, a problem may be caused with the functional circuits. Then, considering the electrical voltage drop caused by electric wire resistor R105, and resistor elements R111, R112, R113, R114, and R115, the outputting electrical voltage of electric power supply circuit board 1001 is controlled, to keep electrical voltage of each of contact points P101, P102, P103, P104, and P105 of the input of each of functional circuits CR101, CR102, CR103, CR104, and CR105 higher than the inputting electrical voltage of the specifications of control circuit board 1200 at all times.

For example, in case that the inputting electrical voltage of the specifications of control circuit board 1200 is 5.0V, the electrical voltage of contact point P110 should be controlled at 5.1V at all times, by constant voltage control.

It is assumed that, in case that the electrical voltage of the contact point P110 is kept at 5.1V at all times, by constant voltage control, switches SW111, SW112, SW113, and SW114 are turned on (in case that the total amount of electrical current flows in control circuit board 1200 is maximum). In the event, electrical current flows in each of functional circuits CR101, CR102, CR103, CR104, and CR105, and electrical voltage at electric wire resistor R105 and each of resistor elements R111, R112, R113, R114, and R115 decreases significantly. In consequence, the electrical voltage of contact point P101 becomes at 5.02V, the electrical voltage of contact point P102 becomes at 5.04V, the electrical voltage of contact point P103 becomes at 5.07V, the electrical voltage of contact point P104 becomes at 5.01V, the electrical voltage of contact point P105 becomes at 5.03V, and the electrical voltage of contact point P106 becomes at 5.07V. Herewith, the circumstances in which the electrical voltage of the contact point of the input of each of functional circuits CR101, CR102, CR103, CR104, and CR105 becomes less than the inputting electrical voltage of the specifications of control circuit board 1200 can be avoided.

The patent document 1 below discloses an electric power supply device which provides a plurality of load boards with common electric power supply voltage. The device comprises a plurality of remote detecting means which detect electrical voltage of the inputting portion of a plurality of load devices, an outputting means which determines outputting electrical voltage of the electric power supply device by a plurality of detected values acquired by the remote detecting means and outputs the same, and a constant voltage control means which controls the outputting means by constant voltage control.

[Document 1] Japan Patent Publication No 2003-169470

Figure 9:
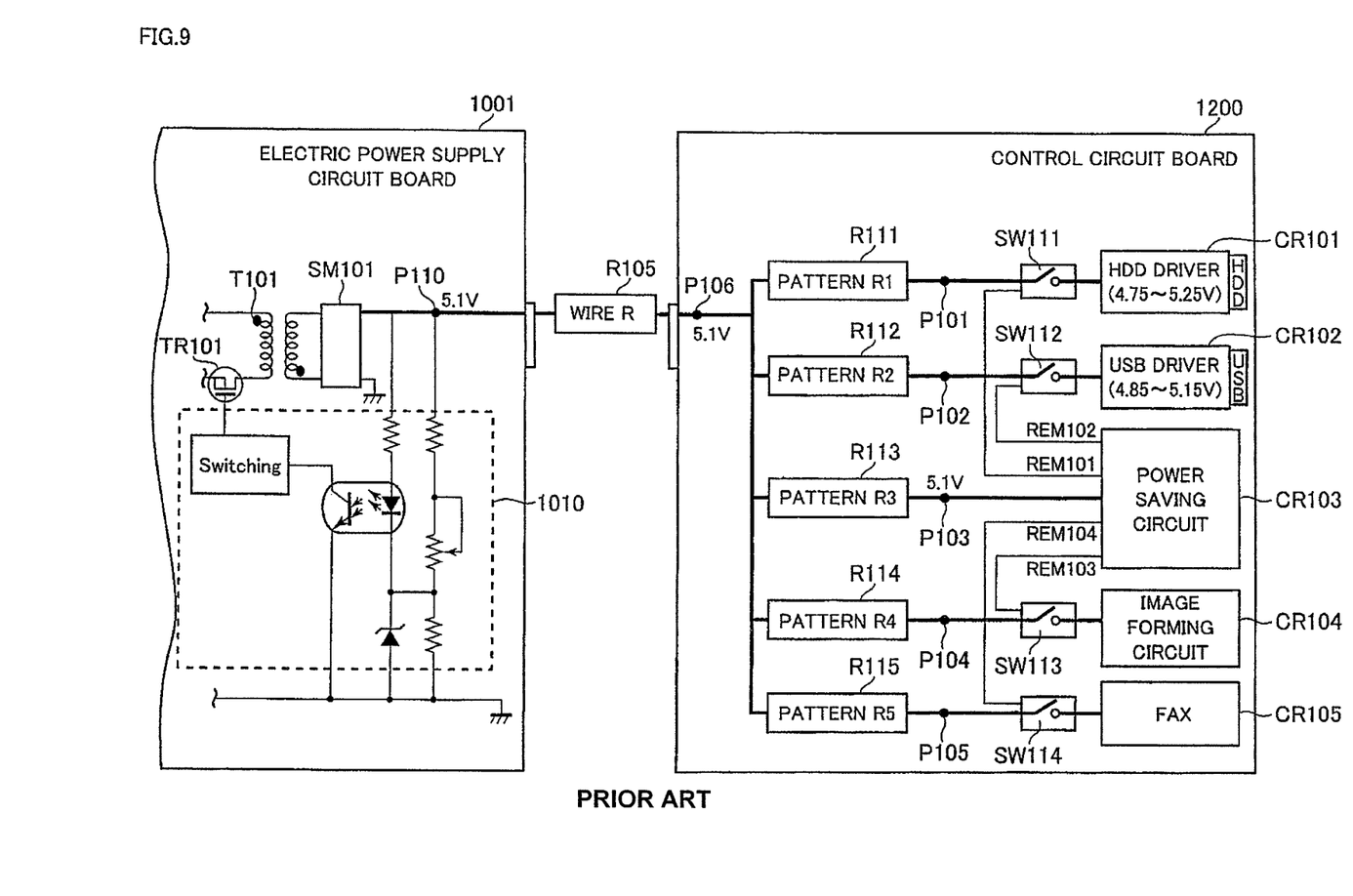
FIG. 9 schematically shows a block diagram of a circuit structure of an electric power supply circuit board and a control circuit board, when a conventional image forming apparatus is in an electrical power saving state.

FIG. 9 schematically shows a block diagram of a circuit structure of an electric power supply circuit board and a control circuit board, when a conventional image forming apparatus is in the electrical power saving state.

Referring to FIG. 9, in case that the image forming apparatus is in the electrical power saving state (an energy saving mode), all of the switches SW111, SW112, SW113, and SW114 are turned off. In this instance, electrical current flows only in functional circuit CR103, out of functional circuits in control circuit board 1200. Because the total amount of electrical current flows in control circuit board 1200 lowers, the electrical voltage drop at electric wire resistor R105 and resistor element R113 is almost exactly zero. In consequence, electrical voltage of contact point P103 becomes at 5.1V which is higher than necessary, although 5.0V is sufficient as electrical voltage of contact point P103, which is the inputting electrical voltage of the specifications of control circuit board 1200. Hence, the amount of power consumption increases.

Specifications of energy saving, needed for electronic devices like image forming apparatuses, become all the more severe recently. To keep pace with such the strict specifications of energy saving, it is important to reduce the amount of power consumption.

SUMMARY OF THE INVENTION

This invention was achieved to solve the above problems. The object is to provide an electric power supply device and an image forming apparatus having the electric power supply device which can reduce the amount of power consumption.

According to an aspect of this invention, an electric power supply device comprises: an electric power providing unit for providing electric power, an electric power control unit for controlling outputting electrical voltage of the electric power providing unit by constant voltage control, so that electrical potential of a remote sensing location is kept constant, a plurality of load blocks being parallely connected to each other, and connected to the electric power providing unit, an electrical power saving circuit for switching the state of each of the load blocks between the state in which the load block is provided with electric power from the electric power providing unit and the state in which the load block is not provided with electric power from the electric power providing unit, and a setting unit for setting the remote sensing location, wherein the setting unit sets a contact point of an input side of a circuit or block in which consumption electrical current is the largest, or a contact point of an input side of a circuit or block in which behavior guarantee minimum electrical voltage is the largest, out of the electrical power saving circuit and the load block which is provided with electric power among the load blocks, as the remote sensing location.

According to another aspect of this invention, an image forming apparatus comprises the electric power supply device, and an image forming unit for forming images.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiment of this invention will be explained in the followings, based on the Figures.

In the following embodiment, an image forming apparatus as an electric power supply device will be explained. An image forming apparatus may be a MFP, a facsimile device, a copying machine, a printer or the like. An electric power supply device may be an apparatus other than an image forming apparatus. An electric power supply device may provide an electronic device other than an image forming apparatus with electric power. In this description, the ground potential is expressed as 0V, and the difference in electrical potential between each of the locations and the ground potential is expressed as an electrical voltage value at each of the locations.

[The Structure of the Image Forming Apparatus]

Figure 1:
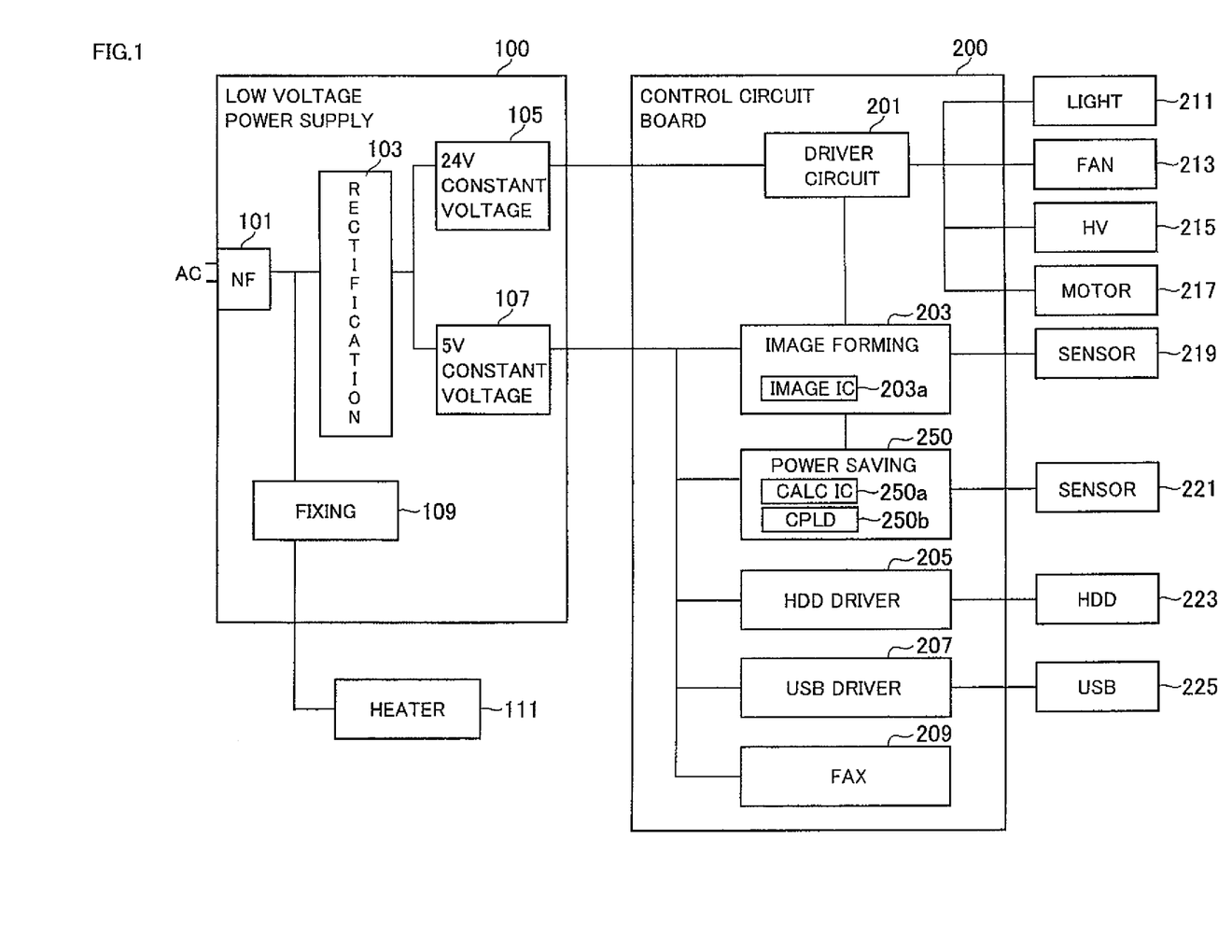
FIG. 1 schematically shows a block diagram of the structure of an image forming apparatus according to the embodiment of this invention.

FIG. 1 schematically shows a block diagram of the structure of the image forming apparatus according to the embodiment of this invention.

Referring to FIG. 1, the image forming apparatus is mainly equipped with a low voltage electric power supply 100, and a control circuit board 200. Low voltage electric power supply 100 converts alternating current electric power from the commercial electric power supply to direct current power, and provides control circuit board 200 with converted direct current power.

Low voltage electric power supply 100 includes a noise filter (NF) 101, a rectification device 103, a constant voltage control circuit 105, a constant voltage control circuit 107, and a fixing circuit 109. Rectification device 103 converts alternating current electric power in which the noise is reduced by NF 101 to direct current power. Constant voltage control circuit 105 controls direct current power converted by rectification device 103, to keep the direct current power around constant 24V. Constant voltage control circuit 107 controls direct current power converted by rectification device 103, to keep the direct current power around constant 5V. Fixing circuit 109 receives input of alternating current electric power in which the noise was reduced by NF 101, and controls electric power to be provided for a heater 111.

Control circuit board 200 includes a driver circuit 201, an image forming circuit 203, an electrical power saving circuit (energy saving circuit) 250, a HDD driver circuit 205, a USB driver circuit 207, and a facsimile circuit 209. Driver circuit 201 is connected with constant voltage control circuit 105, and receives about 24V electric power from constant voltage control circuit 105. Each of image forming circuit 203, electrical power saving circuit 250, HDD driver circuit 205, USB driver circuit 207, and facsimile circuit 209 is connected with constant voltage control circuit 107, and receives about 5V electric power from constant voltage control circuit 107.

Driver circuit 201 receives control signals from image foaming circuit 203, and under certain circumstances, provides a light source 211, a fan 213, a HV (electric power supply output for driving conveying rollers or the like) 215, motor 217, or the like with electrical current, and executes image forming. Light source 211, fan 213, HV215, and motor 217 forms an image forming unit for forming images. Image forming circuit 203 controls image forming. Image forming circuit 203 receives signals from sensor 219, and under certain circumstances, transmits control signals to driver circuit 201. Image forming circuit 203 includes an image processing IC (Integrated Circuit) 203a. Electrical power saving circuit 250 receives signals from sensor 221, and controls the providing electrical current for each of image forming circuit 203, HDD driver circuit 205, USB driver circuit 207, and facsimile circuit 209. Electrical power saving circuit 250 includes calculation IC 250a, and CPLD (Complex Programmable Logic Device) 250b. HDD driver circuit 205 controls the writing information to HDD 223 and the reading information from HDD 223. USB driver circuit 207 controls the writing information to USB 225 and the reading information from USB 225, when USB 225 is connected. Facsimile circuit 209 controls the transmitting and receiving of facsimile.

Figure 2:
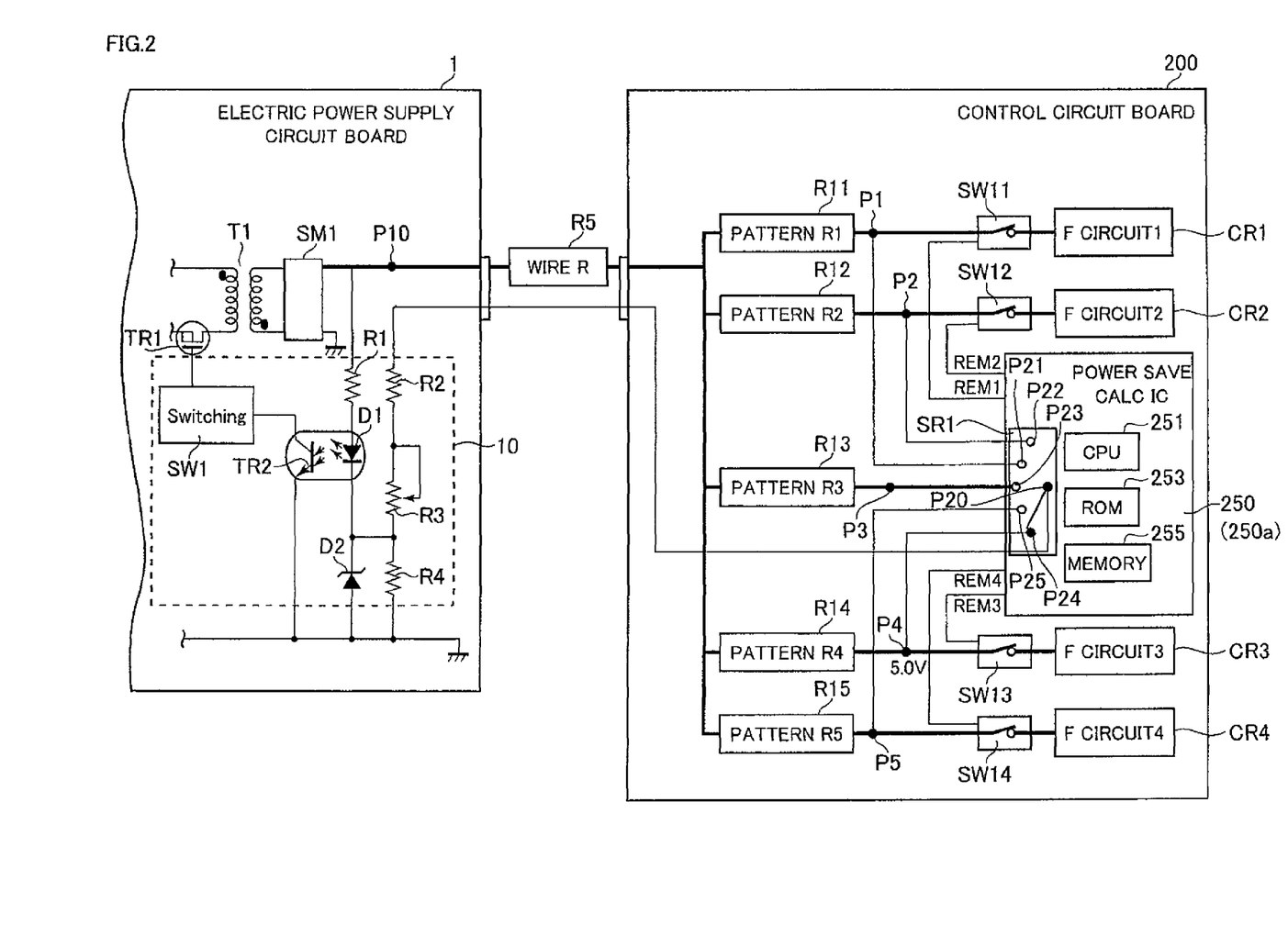
FIG. 2 schematically shows a block diagram of the circuit structure of an electric power supply circuit board and a control circuit board when the image forming apparatus is in normal condition, according to the embodiment of this invention.

FIG. 2 schematically shows a block diagram of the circuit structure of an electric power supply circuit board and the control circuit board, when the image forming apparatus is in normal condition, according to the embodiment of this invention.

Referring to FIG. 2, the image forming apparatus is equipped with an electric power supply circuit board 1 (an example of an electric power providing unit), an electric wire resistor (a wire harness) R5, and control circuit board 200 which controls behavior of each element of the image forming apparatus. Electric power supply circuit board 1 and control circuit board 200 are electrically connected via electric wire resistor R5. Electric power supply circuit board 1 is included in constant voltage control circuit 107 in FIG. 1, and provides control circuit board 200 with about 5V direct current power, via electric wire resistor R5.

Electric power supply circuit board 1 includes a transformer T1, a secondary side rectification smoothing circuit (a condenser) SM1, a constant voltage control unit 10, and a transistor TR1. Transformer T1 is a DC-DC converter, for example. Transistor TR1 is a P channel type MOSFET, for example.

The primary side coil of transformer T1 is connected with the source and the drain of transistor TR1. The secondary side coil of transformer T1 is connected with secondary side rectification smoothing circuit SM1. The one output terminal of secondary side rectification smoothing circuit SM1 is connected with one end of electric wire resistor R5, via the output terminal of electric power supply circuit board 1. The other output terminal of secondary side rectification smoothing circuit SM1 is connected with ground potential. Constant voltage control unit 10 determines the remote sensing location by the following methods. Constant voltage control unit 10 controls outputting electrical voltage of electric power supply circuit board 1, to keep electrical voltage of the determined remote sensing location constant.

Constant voltage control unit 10 includes resistor elements R1, R2, R3, and R4, a switch SW1, a transistor TR2, and diodes D1 and D2. Resistor element R3 is a variable resistor element. Transistor TR2 is a photo transistor. Diode D1 is a light emitting diode. Transistor TR2 and diode D1 configure a photo-coupler. Diode D2 is a Zener diode.

Resistor element R1 diode D1, and diode D2 are connected in series, in this order. One end of resistor element R1 is connected with the one output terminal of secondary side rectification smoothing circuit SM1. The other end is connected with the anode of diode D1. The cathode of diode D1 is connected with the cathode of diode D2. The anode of diode D2 is connected with ground potential.

Resistor element R2, resistor element R3, and resistor element R4 are connected in series, in this order. The terminal of resistor element R2 at which the resistor element R3 is not connected, is connected with contact point P20 in electrical power saving circuit 250, which is explained in the followings. The terminal of resistor element R4 at which the resistor element R3 is not connected, is connected with ground potential. The conducting wire connecting resistor element R3 and resistor element R4 is connected with the cathode of diode D2.

The emitter of transistor TR2 is connected with switch SW1. The collector is connected with ground potential. The gate of transistor TR1 is connected with switch SW1.

Electrical voltage of the cathode of diode D2 becomes electrical voltage based on electrical voltage of contact point P20 which is the remote sensing location. When electrical voltage of the remote sensing location exceeds a reference value, diode D2 reaches breakdown and electrical current flows from switch SW1 to ground potential. In case that the electrical current is detected, switch SW1 turns transistor TR1 off, and lowers outputting electrical voltage of electric power supply circuit board 1. Herewith, outputting electrical voltage of electric power supply circuit board 1 is controlled to be constant, to keep voltage of the remote sensing location constant at all times.

Control circuit board 200 includes resistor elements R11, R12, R13, R14, and R15, switches (power switches) SW11, SW12, SW13, and SW14, an electrical power saving circuit 250, and functional circuits CR1, CR2, CR3, and CR4. Each of resistor elements R11, R12, R13, R14, and R15 is a pattern resistor. Each of electrical power saving circuit 250, functional circuits CR1, CR2, CR3, and CR4 is parallely connected with each other, and is connected with an electric power supply circuit board 1. Each of functional circuits CR1, CR2, CR3, and CR4 is an example of a load block consumes electric power provided by electric power supply circuit board 1, and for example, corresponds to each of image forming circuit 203, HDD driver circuit 205, USB driver circuit 207, facsimile circuit 209, or the like in FIG. 1. The specification of inputting electrical voltage of control circuit board 200 is 5.0V, for example. To make each of electrical power saving circuit 250, and functional circuits CR1, CR2, CR3, and CR4 behave normally, electrical voltage of contact points P1, P2, P3, P4, and P5 of the input side of each of electrical power saving circuit 250, and functional circuits CR1, CR2, CR3, and CR4 should exceed the specification of inputting electrical voltage of control circuit board 200 at all times.

One end of each of resistor elements R11, R12, R13, R14, and R15 is connected with electric wire resistor R5, via the inputting terminal of control circuit board 200. Resistor element R11, switch SW11, and functional circuit CR1 are connected in series, in this order. A contact point P1 is set on the conducting wire connecting resistor element R11 and switch SW11. Resistor element R12, switch SW12, and functional circuit CR2 are connected in series, in this order. A contact point P2 is set on the conducting wire connecting resistor element R12 and switch SW12. Resistor element R13 and electrical power saving circuit 250 are connected in series, in this order. A contact point P3 is set on the conducting wire connecting resistor element R13 and electrical power saving circuit 250. Resistor element R14, switch SW13, and functional circuit CR3 are connected in series, in this order. A contact point P4 is set on the conducting wire connecting resistor element R14 and switch SW13. Resistor element R15, switch SW14, and functional circuit CR4 are connected in series, in this order. A contact point P5 is set on the conducting wire connecting resistor element R15 and switch SW14. The electrical potential of each of contact points P1, P2, P3, P4, and P5 varies based on the behavior of the connected functional circuit.

Calculation IC 250a of electrical power saving circuit 250 includes a selector SR1, a CPU (Central Processing Unit) 251, a ROM (Read Only Memory) 253, and a memory 255. Selector SR1 includes contact points P20, P21, P22, P23, P24, and P25. Contact point P21 is connected with contact point P1. Contact point P22 is connected with contact point P2. Contact point P23 is connected with contact point P3. Contact point P24 is connected with contact point P4. Contact point P25 is connected with contact point P5. Selector SR1 selects a terminal out of contact points P21, P22, P23, P24, and P25 and connects the terminal with contact point P20 electrically.

Each of electric power supply signals (remote signals) REM1, REM2, REM3, and REM4 is a signal to control whether each of functional circuits CR1, CR2, CR3, and CR4 is provided with electric power, or not. CPU 251 controls on/off of each of switches SW11, SW12, SW13, and SW14 by transmitting each of electric power supply signals REM1, REM2, REM3, and REM4. In consequence, the state of each of functional circuits CR1, CR2, CR3, and CR4 is switched between the state in which electric power is provided from electric power supply circuit board 1 and the state in which electric power is not provided from electric power supply circuit board 1 (in the following explanations, this switching is referred to as the switching of the electric power providing state). CPU 251 controls selector SR1. ROM 253 stores a control program for CPU 251. Memory 255 stores various data, such as an information table of the functional circuits.

Figure 3:
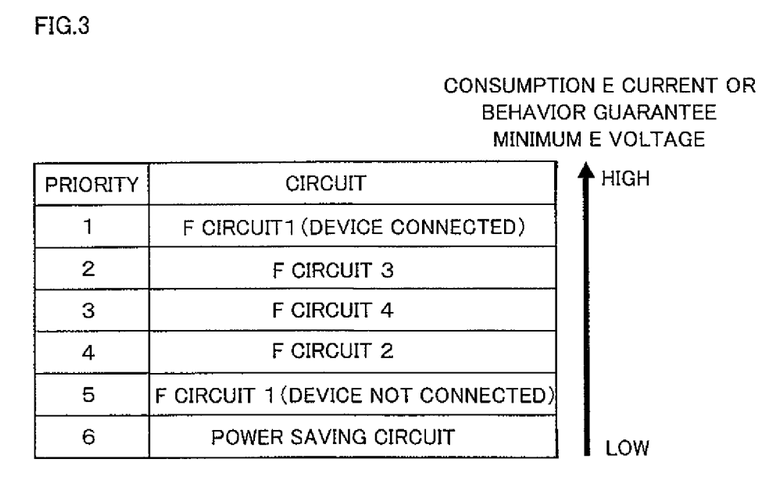
FIG. 3 shows an example of an information table of the functional circuits.

FIG. 3 shows an example of an information table of the functional circuits. In FIG. 3, each of functional circuit 1, functional circuit 2, functional circuit 3, and functional circuit 4 corresponds to each of functional circuit CR1, functional circuit CR2, functional circuit CR3, and functional circuit CR4 in FIG. 2.

Referring to FIG. 3, the information table of the functional circuits describes information of consumption electrical current at each of functional circuits and electrical power saving circuit of the image forming apparatus. Functional circuit 1 shall be a USB driver circuit. In this instance, consumption electrical current of functional circuit 1 when a USB device is connected is larger than consumption electrical current of functional circuit 1 when a USB device is not connected.

In the information table of the functional circuits, the order is functional circuit 1 when a USB device is connected, functional circuit 3, functional circuit 4, functional circuit 2, functional circuit 1 when a USB device is not connected, and the electrical power saving circuit, as arranged in descending order of the magnitude of consumption electrical current or behavior guarantee minimum electrical voltage.

[Behavior of the Image Forming Apparatus]

Next, behavior of the image forming apparatus will be explained with FIG. 2 and FIG. 4.

Referring to FIG. 2, when electric power supply of the image forming apparatus is enabled, electrical power saving circuit 250 is provided with electric power from electric power supply circuit board 1. The image forming apparatus is started up, and in the normal condition. The behavior state of the image forming apparatus changes between the normal condition and the electrical power saving condition in which the power consumption is less than in the normal condition (further, the behavior state of the image forming apparatus may change to or from other conditions). When the image forming apparatus is in the electrical power saving condition and a behavior instruction of a user is received, the image forming apparatus moves to the normal condition. Regardless of the behavior condition of the image forming apparatus, electrical power saving circuit 250 is provided with electric power from electric power supply circuit board 1 at all times.

When the image forming apparatus is in the normal condition, electrical power saving circuit 250 enables at least one of switches SW11, SW12, SW13, and SW14, by turning at least one of electric power supply signals REM1, REM2, REM3, and REM4 on (the signal state for executing electric power supply). Herewith, at least one of functional circuits CR1, CR2, CR3, and CR4 is provided with electric power.

Electrical power saving circuit 250 identifies the circuit which has the maximum consumption electrical current, out of electrical power saving circuit 250 and functional circuits being provided with electric power among functional circuits CR1, CR2, CR3, and CR4. Electrical power saving circuit 250 sets the input side contact point of the identified circuit as the remote sensing location. More specifically, electrical power saving circuit 250 sets one of contact points P1, P2, P3, P4, and P5 as the remote sensing location. The contact point set as the remote sensing location is electrically connected with contact point P20 via contact point P21, P22, P23, P24, or P25 by the controlling of CPU 251. Herewith, electrical voltage of the remote sensing location is fed back to constant voltage control unit 10.

Here, it is assumed that electrical power saving circuit 250 turns all of electric power supply signals REM1, REM2, REM3, and REM4 on (and functional circuit 1 does not connect with a USB device). In this instance, all of the switches SW11, SW12, SW13, and SW14 are enabled, and all of the functional circuits CR1, CR2, CR3, and CR4 are provided with electric power.

Electrical power saving circuit 250 identifies the functional circuit CR3 which has the maximum consumption electrical current, out of electrical power saving circuit 250, functional circuits CR1, CR2, CR3, and CR4 which are provided with electric power, based on the information table of the functional circuits. Electrical power saving circuit 250 connects contact point P20 with contact point P24 at selector SR1, and set contact point P4 of the input side of functional circuit CR3 as the remote sensing location.

A reference value of electrical voltage at the remote sensing location is set 5.0V which is the same value as the specification of inputting electrical voltage of control circuit board 200. More specifically, constant voltage control unit 10 controls outputting electrical voltage of electric power supply circuit board 1 (electrical voltage of contact point P10) by constant voltage control, to keep electrical voltage of contact point P4 of the input side of functional circuit CR3 at 5.0V. In consequence, electrical voltage of contact points P1, P2, P3, and P5 of the input side of each of functional circuit CR1, functional circuit CR2, electrical power saving circuit 250, and functional circuit CR4 is kept at more than or equal to 5.0V. This is by the following basis. Since consumption electrical current of each of functional circuit CR1, functional circuit CR2, electrical power saving circuit 250, and functional circuit CR4 is less than consumption electrical current of functional circuit CR3, the amount of electrical voltage drop from the outputting terminal of electric power supply circuit board 1 to each of contact points P1, P2, P3, and P5 is less than the amount of electrical voltage drop from the outputting terminal of electric power supply circuit board 1 to contact point P4. In consequence, electrical voltage of contact points P1, P2, P3, and P5 is higher than electrical voltage of contact point P4 at all times.

Figure 4:
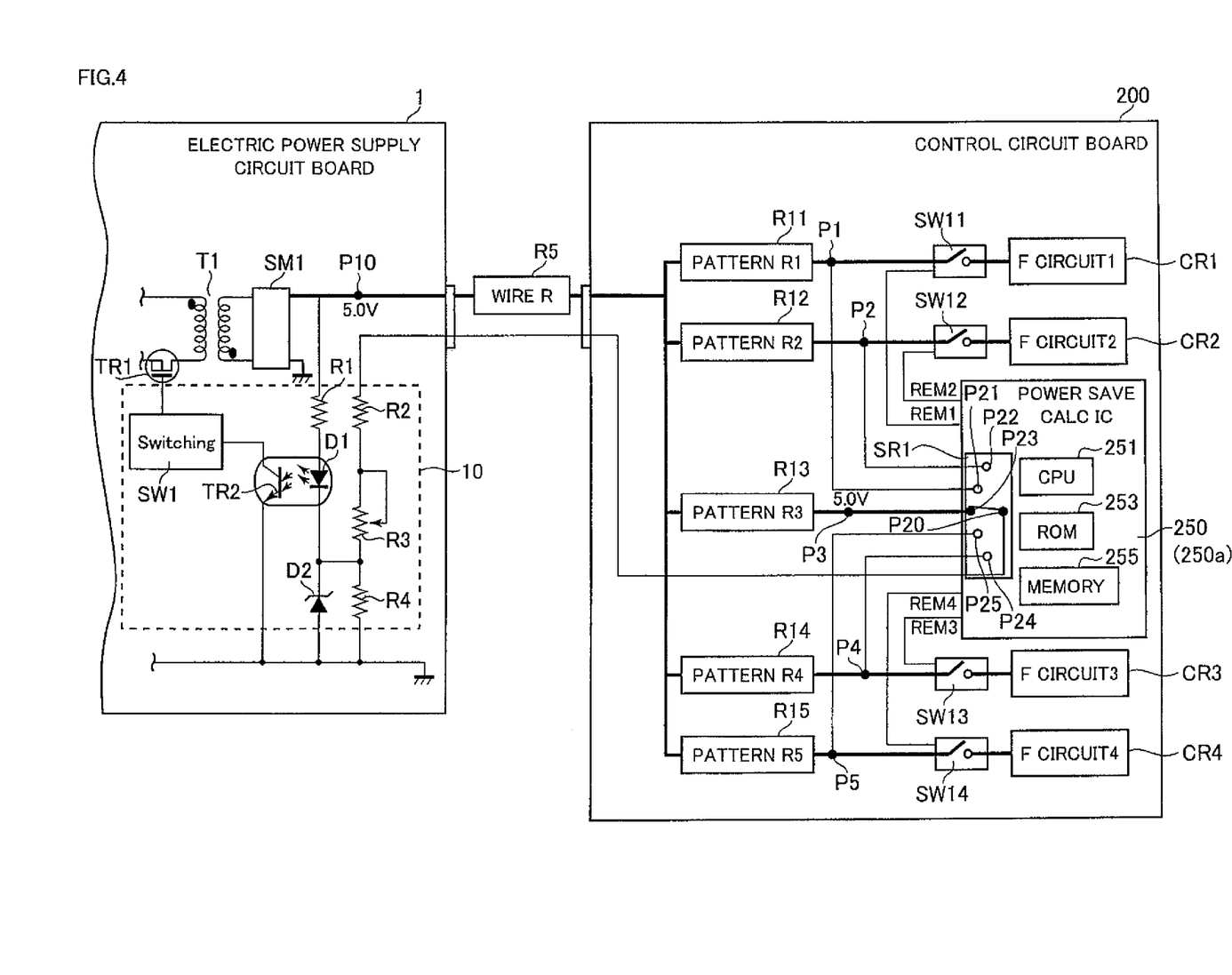
FIG. 4 schematically shows a block diagram of the circuit structure of an electric power supply circuit board and a control circuit board when the image forming apparatus is in electrical power saving state, according to the embodiment of this invention.

FIG. 4 schematically shows a block diagram of the circuit structure of the electric power supply circuit board and the control circuit board, when the image forming apparatus is in electrical power saving state, according to the embodiment of this invention.

Referring to FIG. 4, when the image forming apparatus is in normal condition, and does not receive behavior instructions by a user within a prescribed period, the image forming apparatus moves to the electrical power saving condition.

In case that the image forming apparatus is in the electrical power saving condition, electrical power saving circuit 250 turns all of electric power supply signal REM1, REM2, REM3, and REM4 off (makes the signals do not provide electric power) and turns all of switches SW11, SW12, SW13, and SW14 off. Herewith, all of functional circuits CR1, CR2, CR3, and CR4 are not provided with electric power, and only electrical power saving circuit 250 is provided with electric power.

In case that the image forming apparatus is in the electrical power saving condition, since all of functional circuits CR1, CR2, CR3, and CR4 are not provided with electric power, electrical power saving circuit 250 identifies electrical power saving circuit 250 as the circuit in which the consumption electrical current is the largest, and sets contact point P3 of the input side of electrical power saving circuit 250 as the remote sensing location. Contact point P3 is electrically connected with contact point P20 via contact point P23, by the controlling of CPU 251.

The reference value of electrical voltage at the remote sensing location is still at 5.0V which is the same as the specification of inputting electrical voltage of control circuit board 200. In case that the image forming apparatus is in electrical power saving condition, since only electrical power saving circuit 250 is provided with electric power, the total amount of consumption electrical current flows in control circuit board 200 (electrical current flows in electric wire resistor R5) becomes smaller, and the amount of electrical voltage drop from the outputting terminal of electric power supply circuit board 1 to contact point P3 becomes almost exactly zero. In consequence, outputting electrical voltage of electric power supply circuit board 1 (the inputting electric power of the image forming apparatus) can be at 5.0V which is a low value. Hence, the amount of power consumption, during the image forming apparatus is in the electrical power saving condition, can be reduced.

The switching timing of the electric power providing state of at least one of functional circuits CR1, CR2, CR3, and CR4 (the timing of switching between the ON signal and the OFF signal of at least one of electric power supply signals REM1, REM2, REM3, and REM4) may precede or succeed the switching timing of the remote sensing location (the timing of switching the contact point which is connected with contact point P20). However, the following method should preferably be adopted, to avoid the situation in which the system is reset by inrush electrical current flows in the functional circuit in the state of receiving electric power, when switching the electric power providing state of at least of functional circuits CR1, CR2, CR3, and CR4.

It is assumed that the electric power providing state of at least one of functional circuits CR1, CR2, CR3, and CR4 is switched, so that the total consumption electrical current of functional circuits CR1, CR2, CR3, and CR4 increases, when the image forming apparatus moves from the electrical power saving condition to the normal condition, for example. In this situation, electrical power saving circuit 250 changes the remote sensing location before switching the electric power providing state of at least one of functional circuits CR1, CR2, CR3, and CR4. It is assumed that the electric power providing state of at least one of functional circuits CR1, CR2, CR3, and CR4 is switched, so that the total consumption electrical current of functional circuits CR1, CR2, CR3, and CR4 decreases, when the image forming apparatus moves from the normal condition to the electrical power saving condition, for example. In this situation, electrical power saving circuit 250 changes the remote sensing location after switching the electric power providing state of at least one of functional circuits CR1, CR2, CR3, and CR4.

Figure 5:
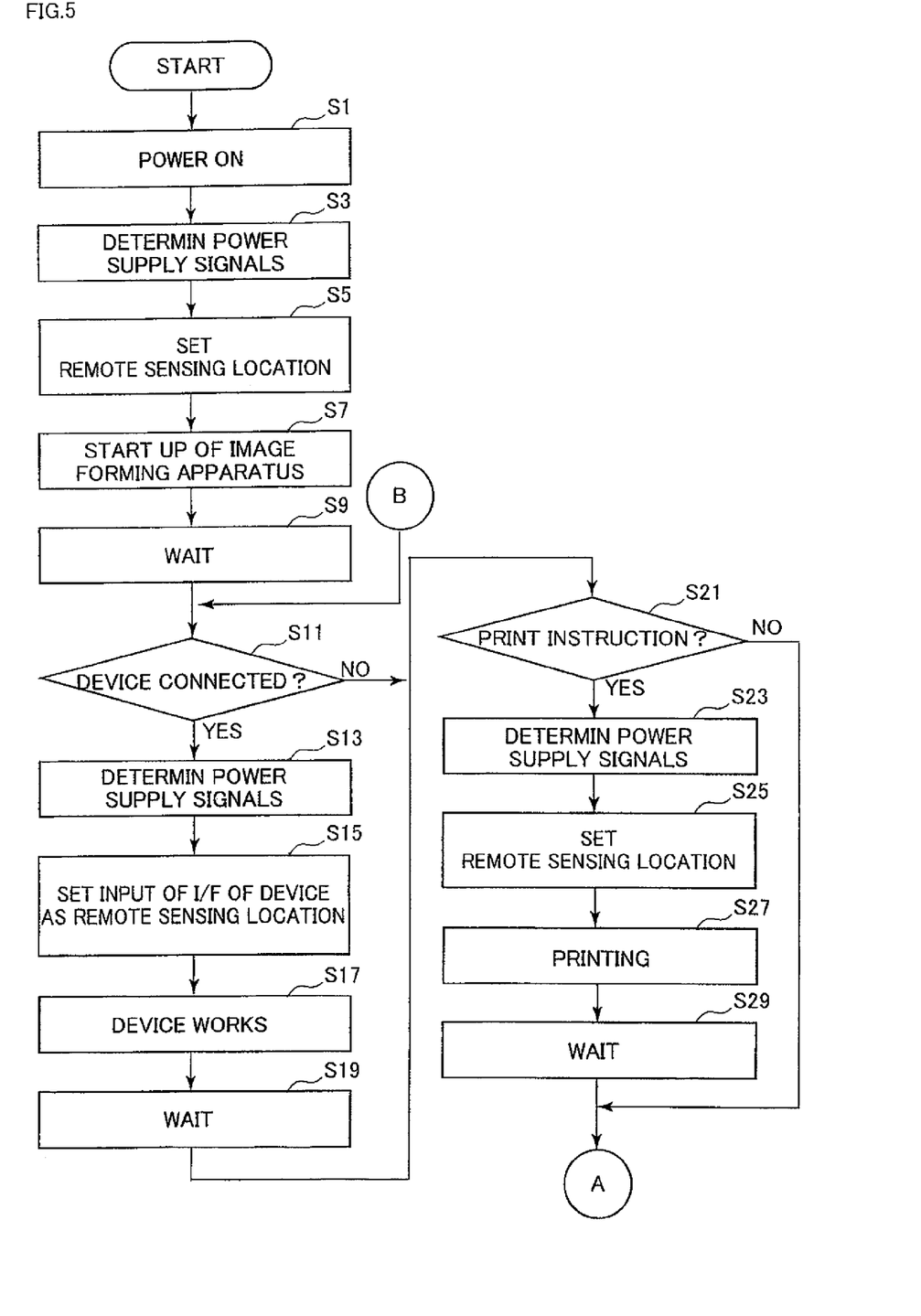
FIG. 5 shows the first half of a flowchart of behavior of the image forming apparatus, according to the embodiment of this invention.
Figure 6:
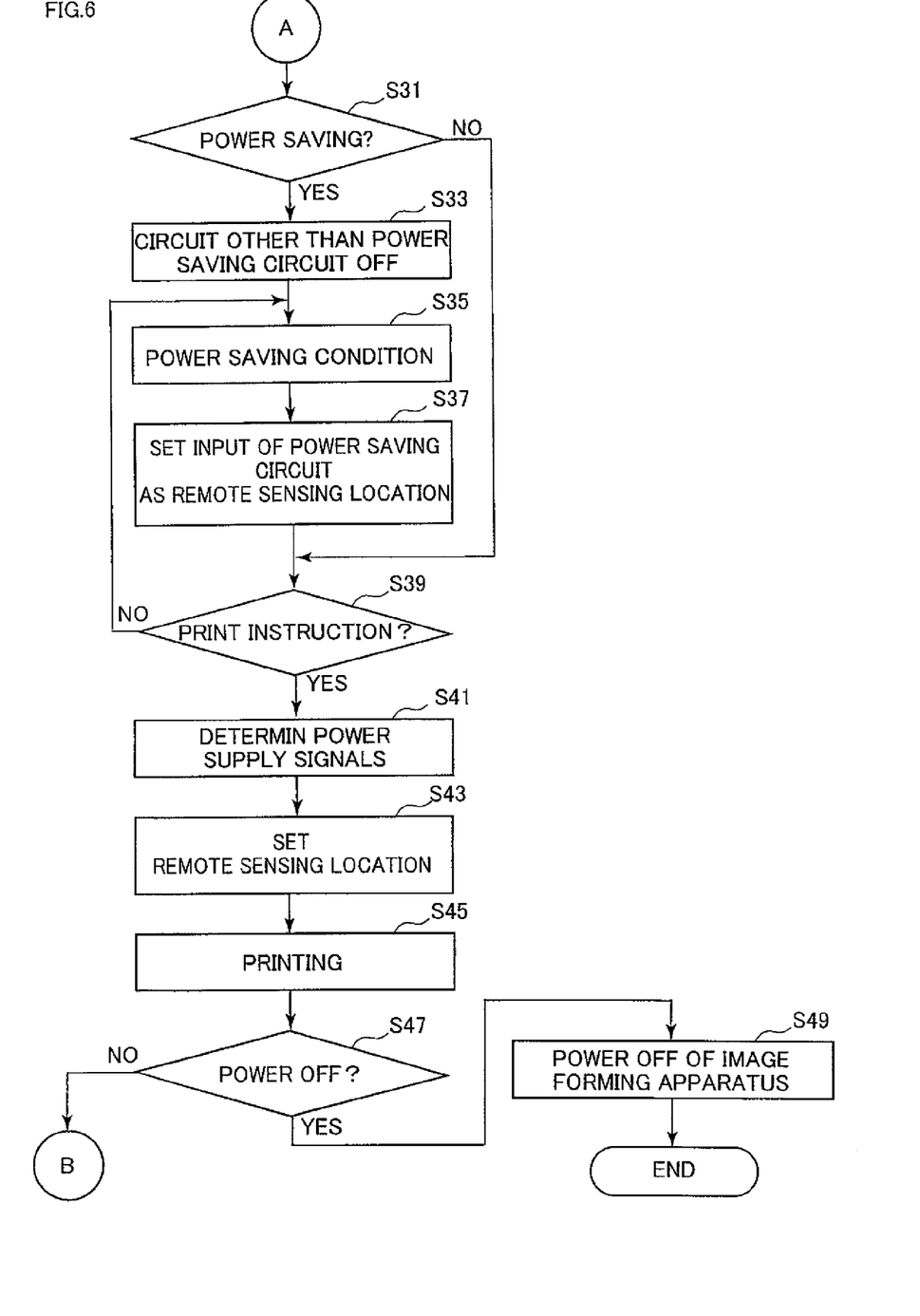
FIG. 6 shows the latter half of the flowchart of behavior of the image forming apparatus, according to the embodiment of this invention.

FIGS. 5 and 6 show a flowchart of behavior of the image forming apparatus, according to the embodiment of this invention.

Referring to FIG. 5, when the electric power supply of the image forming apparatus is enabled, and electrical power saving circuit 250 is provided with electric power (the electrical power saving circuit is enabled) (S1), CPU 251 in electrical power saving circuit 250 determines the electric power supply signal of each of functional circuits CR1, CR2, CR3, and CR4 (S3). Next, CPU 251 sets the remote sensing location, based on the determined electric power supply signal of each of functional circuits CR1, CR2, CR3, and CR4 and information of the magnitude relation of consumption electrical current of each of functional circuits CR1, CR2, CR3, and CR4, and executes constant voltage control (S5). More specifically, CPU 251 sets the contact point of the input side of the circuit in which the consumption electrical current is the largest, out of electrical power saving circuit 250, and functional circuits provided with electrical current, as the remote sensing location. After setting the remote sensing location, CPU 251 transmits the electric power supply signals determined of each of functional circuits CR1, CR2, CR3, and CR4, so that the image forming apparatus starts up (S7), and waits for behavior instructions from users (S9). Next, CPU 251 determines whether the sensor or the like detects the attachment of a device, for example a USB device, or not (S11).

At step S11, in case that the sensor or the like detects the attachment of a device (YES at S11), CPU 251 in electrical power saving circuit 250 determines the electric power supply signals of each of functional circuits CR1, CR2, CR3, and CR4 (S13). Next, CPU 251 sets the remote sensing location, based on electric power supply signals determined of each of functional circuits CR1, CR2, CR3, and CR4, and information of the magnitude relation of consumption electrical current of each of functional circuits CR1, CR2, CR3, and CR4, and executes the constant voltage control (S15). Herewith, electrical voltage for behavior of the device is satisfied. More specifically, CPU 251 sets the contact point (the inputting terminal) of the input side of the interface circuit of the device, as the remote sensing location. Herewith, electrical voltage for behavior of the device is satisfied. CPU 251 makes the device work (S17), waits for behavior instructions from users (S19), and steps in the process of step S21.

At step S11, in case that the sensor or the like does not detect the attachment of a device (NO at S11), CPU 251 steps in the process of step S21.

At step S21, CPU 251 determines whether the print instruction of a user is received, or not (S21).

At step S21, in case that the print instruction is received (YES at S21), CPU 251 determines the electric power supply signals of each of functional circuits CR1, CR2, CR3, and CR4 (S23). Next, CPU 251 sets the remote sensing location based on the electric power supply signals determined of each of functional circuits CR1, CR2, CR3, and CR4, and the information of the magnitude relation of consumption electrical current of each of functional circuits CR1, CR2, CR3, and CR4, and executes the constant voltage control (S25). More specifically, CPU 251 sets the contact point of the input side of the circuit in which the consumption electrical current is the largest, out of electrical power saving circuit 250, and functional circuits provided with electrical current, as the remote sensing location. After setting the remote sensing location, CPU 251 executes the print behavior (S27), waits for behavior instructions from users (S29), and steps in the process of step S 31 in FIG. 6.

At step S21, in case that the print instruction is not received (NO at S21), CPU 251 steps in the process of step S31 in FIG. 6.

Referring to FIG. 6, at step S31, CPU 251 determines whether the image forming apparatus receives the instruction (the energy saving instruction) for moving to the electrical power saving condition, or not (S31). At step S31, in case that the image forming apparatus receives the instruction for moving to the electrical power saving condition (YES at S31), CPU 251 determines that all of the electric power supply signals of functional circuits CR1, CR2, CR3, and CR4 are set as OFF signals, and turns circuits other than electrical power saving circuit 250 off (S33). Next, when the moving to electrical power saving condition is completed (S35), CPU 251 sets the remote sensing location based on the electric power supply signals determined of each of functional circuits CR1, CR2, CR3, and CR4 and the information of the magnitude relation of consumption electrical current of each of functional circuits CR1, CR2, CR3, and CR4, and executes constant voltage control (S37). More specifically, CPU 251 sets the contact point of the input side of electrical power saving circuit 250 as the remote sensing location. Namely, after disabling the circuits other than electrical power saving circuit 250, CPU 251 changes the remote sensing location. After the setting of the remote sensing location, CPU 251 steps in the process of step S39.

At step S31, in case that the image forming apparatus does not receive the instruction for moving to the electrical power saving condition (NO at S31), CPU 250 steps in the process of step S39.

At step S39, CPU 251 determines whether the print instruction from a user is received, or not (S39).

At step S 39, in case that the print instruction is received (YES at S39), CPU 251 determines the electric power supply signals of each of functional circuits CR1, CR2, CR3, and CR4 (S41). Next, CPU 251 sets the remote sensing location based on the electric power supply signals determined of each of functional circuits CR1, CR2, CR3, and CR4, and the information of the magnitude relation of consumption electrical current of each of functional circuits CR1, CR2, CR3, and CR4, and executes constant voltage control (S43). More specifically, CPU 251 sets the contact point of the input side of the circuit in which the consumption electrical current is the largest, out of electrical power saving circuit 250, and functional circuits provided with electrical current. After setting of the remote sensing location, CPU 251 moves to the normal condition, and executes the print behavior (S45). Next, CPU 251 determines whether electric power supply of the image forming apparatus is turned off, or not (S47).

At step S47, in case that electric power supply of the image forming apparatus is turned off (YES at S47), CPU 251 turns the electric power supply of the image forming apparatus off (S49), and terminate the process.

At step S47, in case that the electric power supply of the image forming apparatus is not turned off (NO at S47), CPU 251 steps in the process of step S11 in FIG. 5.

[Modification]

According to the above embodiment, whenever the image forming apparatus is in the normal condition or the electrical power saving condition, electrical power saving circuit 250 sets the remote sensing location. In this invention, in case that the image forming apparatus is in electrical power saving condition, electrical power saving circuit 250 sets the remote sensing location, and in case that the image forming apparatus is in normal condition, an arbitrary functional circuit may set the remote sensing location.

Figure 7:
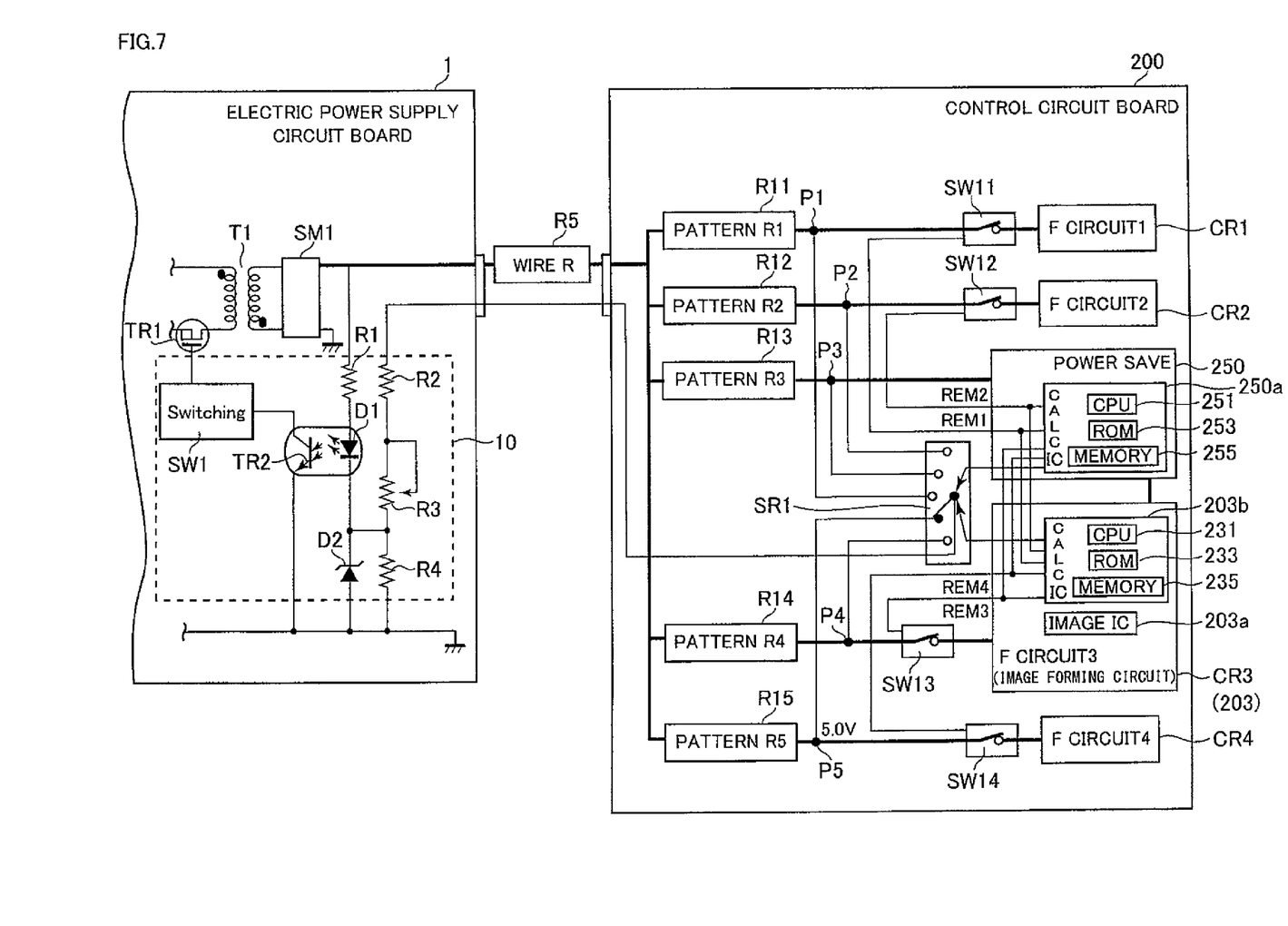
FIG. 7 schematically shows a block diagram of the circuit structure of an electric power supply circuit board and a control circuit board when the image forming apparatus is in normal condition, according to the modification of this invention.

FIG. 7 schematically shows a block diagram of the circuit structure of an electric power supply circuit board and a control circuit board, when the image forming apparatus is in normal condition, according to the modification of this invention.

Referring to FIG. 7, in this modification, the example in which functional circuit CR3 (an example of a working circuit) as an image forming circuit sets the remote sensing location, when the image forming apparatus is in normal condition, will be explained. Functional circuit CR3 shall be image forming circuit 203.

Selector SR1 is apart from calculation IC 250a of electrical power saving circuit 250. Image forming circuit 203 includes image processing IC 203a and calculation IC 203b. Calculation IC 203b includes CPU 231, ROM 233, and memory 235. ROM 233 stores control programs of CPU 231. Memory 235 stores various data such an information table of the functional circuits, etc.

When the image forming apparatus is in normal condition (for example, in printing state or in waiting state), CPU 231 transmits each of electric power supply signals REM1, REM2, REM3, and REM4, and controls ON/OFF of each of switches SW11, SW12, SW13, and SW14. When the image forming apparatus is in normal condition, CPU 231 sets the remote sensing location, and controls selector SR1.

When the image forming apparatus is in electrical power saving condition, CPU 251 transmits each of electric power supply signals REM1, REM2, REM3, and REM4, and controls ON/OFF of each of switches SW11, SW12, SW13, and SW14. When the image forming apparatus is in electrical power saving condition, CPU 251 sets the contact point P3 of the input side of electrical power saving circuit 250 as the remote sensing location, and controls selector SR1.

[The Advantages of the Embodiment]

According to the above embodiment, the remote sensing electrical potential of the electric power supply circuit board is set at the contact point of the input side of the electrical power saving circuit or the functional circuit, in which the consumption electrical current is large. Herewith the electrical voltage of the input side end of each of the electrical power saving circuit and functional circuits satisfies the specifications of inputting electrical voltage of the control circuit board, when the image forming apparatus works with large electrical current, even though the electrical voltage drop at the electric wire resistor (a wire harness) and the pattern resistor of the control circuit board is not considered, when a reference value in constant voltage control is set. In case that the image forming apparatus works with small electrical current, remote sensing electrical potential of the electric power supply circuit board is set as the contact point of the input side of the electrical power saving circuit. Herewith, the inputting electric power of the image forming apparatus can be kept small, and the amount of power consumption can be reduced when the image forming apparatus is in electrical power saving condition.

[Others]

The structures of the constant voltage control unit, the functional circuits, the electrical power saving circuit, or the like in the above embodiment are examples. The structures are arbitrary.

The information table of the functional circuits may be a table describing information of the magnitude relation of behavior guarantee minimum electrical voltage at each of the electrical power saving circuit and functional circuits in the image forming apparatus. The behavior guarantee minimum electrical voltage means the minimum electrical voltage value within the electrical voltage range in which the stable behavior of the electrical power saving circuit or functional circuits is guaranteed. In this instance, electrical power saving circuit identifies the circuit in which the behavior guarantee minimum electrical voltage is the largest, out of the electrical power saving circuit and functional circuits provided with the electric power, based on the information table of the functional circuits, and sets the contact point of the input side of the identified circuit as the remote sensing location.

According to the embodiment, an electric power supply device and an image forming apparatus having the same, which can reduce the amount of power consumption, can be provided.

The processes described in the above embodiments can be executed by software or a hardware circuit. A computer program which executes the processes in the above embodiments can be provided. The program may be provided recorded in recording media of CD-ROMs, flexible disks, hard disks, ROMs, RAM, memory cards, or the like to users. The program is executed by a computer of a CPU or the like. The program may be downloaded to a device via communication lines like the internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electric power supply device comprising:
   an electric power providing unit for providing electric power,
   an electric power control unit for controlling outputting electrical voltage of the electric power providing unit by constant voltage control, so that electrical potential of a remote sensing location is kept constant,
   a plurality of load blocks being parallely connected to each other, and connected to the electric power providing unit,
   an electrical power saving circuit for switching the state of each of the load blocks between the state in which the load block is provided with electric power from the electric power providing unit and the state in which the load block is not provided with electric power from the electric power providing unit, and
   a setting unit for setting the remote sensing location, wherein
   the setting unit sets a contact point of an input side of a circuit or block in which consumption electrical current is the largest, or a contact point of an input side of a circuit or block in which behavior guarantee minimum electrical voltage is the largest, out of the electrical power saving circuit and the load block which is provided with electric power among the load blocks, as the remote sensing location.

2. The electric power supply device according to claim 1, further comprising:
   a storing unit for storing at least one of information relating to consumption electrical current of each of the electrical power saving circuit and the load blocks, and information relating to behavior guarantee minimum electrical voltage of each of the electrical power saving circuit and the load blocks, wherein
   the setting unit sets the remote sensing location, based on the information stored by the storing unit.

3. The electric power supply device according to claim 1, wherein
   the electric power supply device changes the behavior states between normal condition in which at least one of the load blocks and the electrical power saving circuit are provided with electric power, and electrical power saving condition in which the load blocks are not provided with electric power and the electrical power saving circuit is provided with electric power.

4. The electric power supply device according to claim 3, wherein
the electrical power saving circuit functions as the setting unit to set the remote setting location, in any cases when the electric power supply device is in normal condition and in electrical power saving condition.

5. The electric power supply device according to claim 3, wherein
the electrical power saving circuit functions as the setting unit to set the remote setting location, when the electric power supply device is in electrical power saving condition, and
at least one of the load blocks functions as the setting unit to set the remote setting location, when the electric power supply device is in normal condition.

6. The electric power supply device according to claim 3, wherein
the setting unit changes the remote sensing location before switching condition of each of the load blocks, in case that the electrical power saving circuit switches condition of each of load blocks, so that consumption electrical current of all of the load blocks increases.

7. The electric power supply device according to claim 3, wherein
the setting unit changes the remote sensing location after switching condition of each of the load blocks, in case that the electrical power saving circuit switches condition of each of load blocks, so that consumption electrical current of all of the load blocks decreases.

8. The electric power supply device according to claim 1, further comprising:
a first circuit board having the electric power providing unit and the electric power control unit, and
a second circuit board having the load blocks, the electrical power saving circuit, and the setting unit, and electrically connected with the first circuit board.

9. The electric power supply device according to claim 1, wherein
the setting unit sets the contact point of the input side of the circuit or block, in which the consumption electrical current is the largest, out of the electrical power saving circuit and load blocks provided with electric power, as the remote sensing location.

10. The electric power supply device according to claim 1, wherein
the setting unit sets the contact point of the input side of the circuit or block, in which the behavior guarantee minimum electrical voltage is the largest, out of the electrical power saving circuit and load blocks provided with electric power, as the remote sensing location.

11. An image forming apparatus comprising:
the electric power supply device according to claim 1, and
an image forming unit for forming images.

\* \* \* \* \*